US008789175B2

(12) United States Patent
Hubner et al.

(10) Patent No.: US 8,789,175 B2
(45) Date of Patent: Jul. 22, 2014

(54) DEVICE SECURITY SYSTEM

(75) Inventors: Paul V. Hubner, McKinney, TX (US); Robert Angelo Clavenna, II, Lucas, TX (US); Kristopher Alan Pate, Sachse, TX (US); Steven Thomas Archer, Dallas, TX (US); Adam E. Steczko, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 723 days.

(21) Appl. No.: 12/894,918

(22) Filed: Sep. 30, 2010

(65) Prior Publication Data

US 2012/0084857 A1 Apr. 5, 2012

(51) Int. Cl.
*G06F 21/00* (2013.01)

(52) U.S. Cl.
USPC .......................................................... 726/22

(58) Field of Classification Search
CPC ...... G08B 25/00; G08B 25/001; G08B 13/00; G08B 13/02; G08B 13/14; G08B 13/1409; G08B 13/1418; G06F 21/00; G06F 21/50; G06F 21/55; G06F 21/552; G06F 21/554; G06F 21/70; G06F 21/78; G06F 21/81; G06F 21/86; G06F 21/88; H04L 63/00
USPC ......... 726/22; 705/51–54, 405; 713/189–194; 717/168–178
See application file for complete search history.

(56) References Cited

U.S. PATENT DOCUMENTS

| | | | | |
|---|---|---|---|---|
| 2002/0171546 | A1* | 11/2002 | Evans et al. | 340/540 |
| 2003/0117316 | A1* | 6/2003 | Tischer | 342/357.1 |
| 2003/0160862 | A1* | 8/2003 | Charlier et al. | 348/14.08 |
| 2004/0267944 | A1* | 12/2004 | Britt, Jr. | 709/229 |
| 2006/0265195 | A1* | 11/2006 | Woodard et al. | 702/188 |
| 2007/0147346 | A1* | 6/2007 | Gilmartin | 370/352 |
| 2009/0109008 | A1* | 4/2009 | Kuo et al. | 340/426.18 |

* cited by examiner

*Primary Examiner* — William Goodchild

(57) ABSTRACT

A computer-implemented method may include identifying a security event condition associated with a device. One or more security rules may be identified for execution based on the device and the identified security event condition, wherein the one or more security rules define security related actions to be performed upon occurrence of the security event condition. The security related actions may be initiated by at least one processor on the device to secure the device from unauthorized use.

19 Claims, 8 Drawing Sheets

DEVICE SECURITY SYSTEM

BACKGROUND

Security of electronic devices and the data they provide access to is of growing importance in our society. Everything from financial records, to trade secrets, to confidential military documents are typically maintained in electronic form accessible by one or more physical devices. Accordingly, identifying effective systems for securing such devices is of utmost importance in an attempt to effectively secure the underlying data. Moreover, although data may be protected mathematically through the use of encryption techniques or the like, these techniques fail to adequately address the limitations imposed by the use of human beings and physical access devices. For example, unattended computer terminals can mean unlocked access to networks, data, and assets.

DETAILED DESCRIPTION OF PREFERRED EMBODIMENTS

The following detailed description refers to the accompanying drawings. The same reference numbers in different drawings may identify the same or similar elements. Also, the following detailed description does not limit the embodiments disclosed herein.

Figure 1:
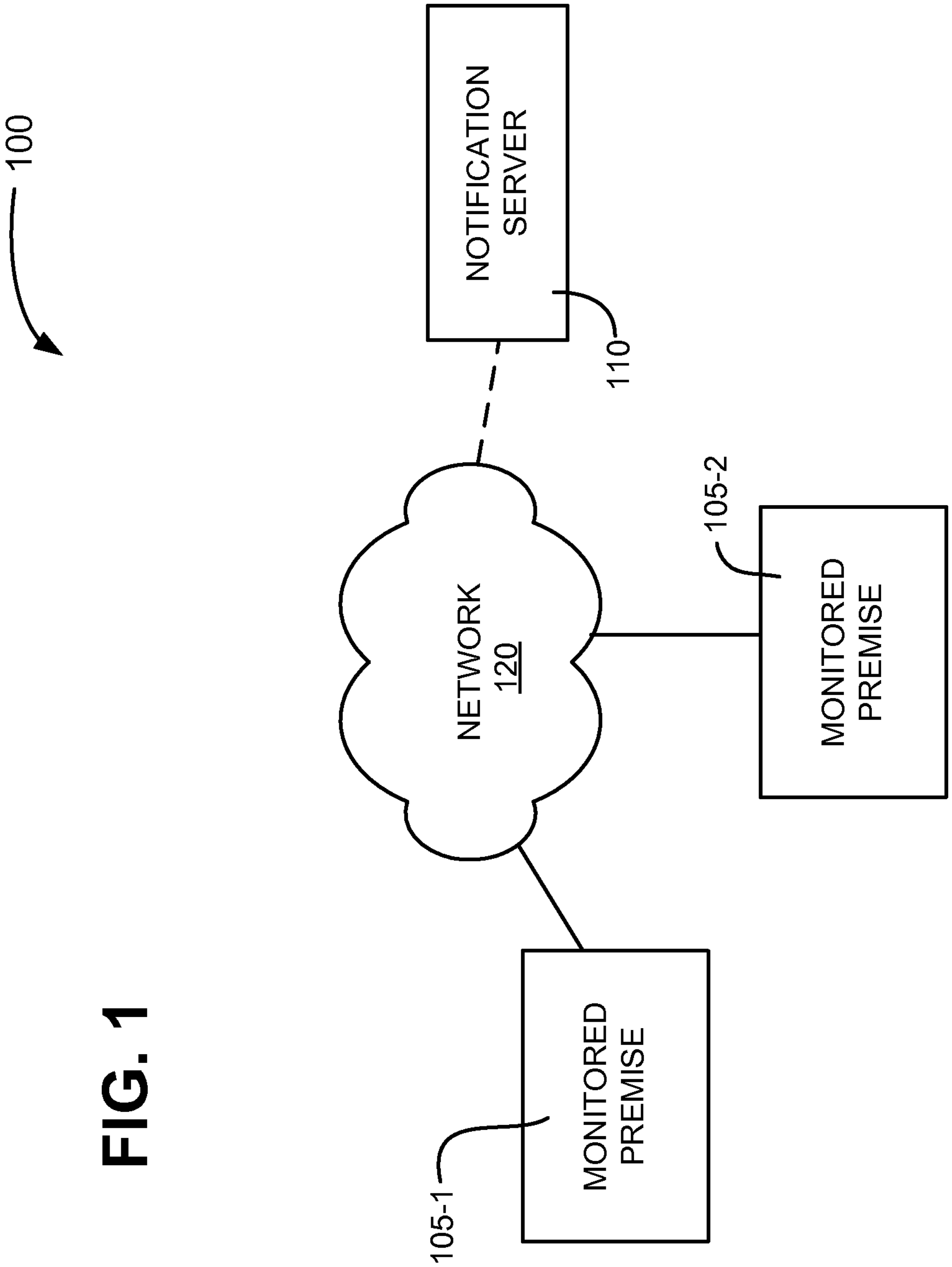
FIG. 1 illustrates a block diagram of an exemplary environment in which systems and methods described herein may be implemented.

FIG. 1 is a block diagram of an exemplary environment 100 in which systems and methods described herein may be implemented. As shown, environment 100 may include monitored premises 105-1 and 105-2 (collectively referred to as "monitored premises 105" and individually referred to as "monitored premise 105") and a notification server 110 connected via a network 120.

Consistent with embodiments described herein, monitored premise 105 may include any facility or collection of facilities in which alarm or security monitoring is performed. Examples include homes, offices, office buildings, school campuses, government buildings, airports, sports stadiums, etc. As described in additional detail below with respect to FIG. 2, each monitored premise 105 may include a number of securable devices and an alarm or security system.

Notification server 110 may include any device or combination of devices configured to receive alarm or alert information from monitored premise 105 and to provide alarm notifications to registered or otherwise identified entities/devices. Security or alarm notifications may be provided for a number of security-related events, such as fire alarm conditions, security system alerts, etc. In some embodiments, notifications from notification server 110 may include event handling instructions associated with the particular event. In other embodiments, event handling instructions or commands are identified at each device in monitored premise 105. All or some of the information processing performed by notification server 110 may be performed by a device (or devices) associated with (e.g., co-located with) monitored premise 105.

Network 120 may include a local area network (LAN), a wide area network (WAN), a metropolitan area network (MAN), a telephone network, such as the Public Switched Telephone Network (PSTN), an intranet, a portion of the Internet, an optical fiber-based network, or a combination of networks. In some implementations, network devices 105 may be specifically related to a particular entity, such as a company, a governmental body, etc.

Network 120 may include network devices that are not shown, such as voice gateways, routers, switches, firewalls, and/or servers. Network 120 may include a hardwired network using wires and/or optical fibers and/or a wireless network using free-space optical and/or radio frequency (RF) transmission paths. Implementations of networks and/or devices described herein are not limited to any particular data format, type, and/or protocol.

Figure 2:
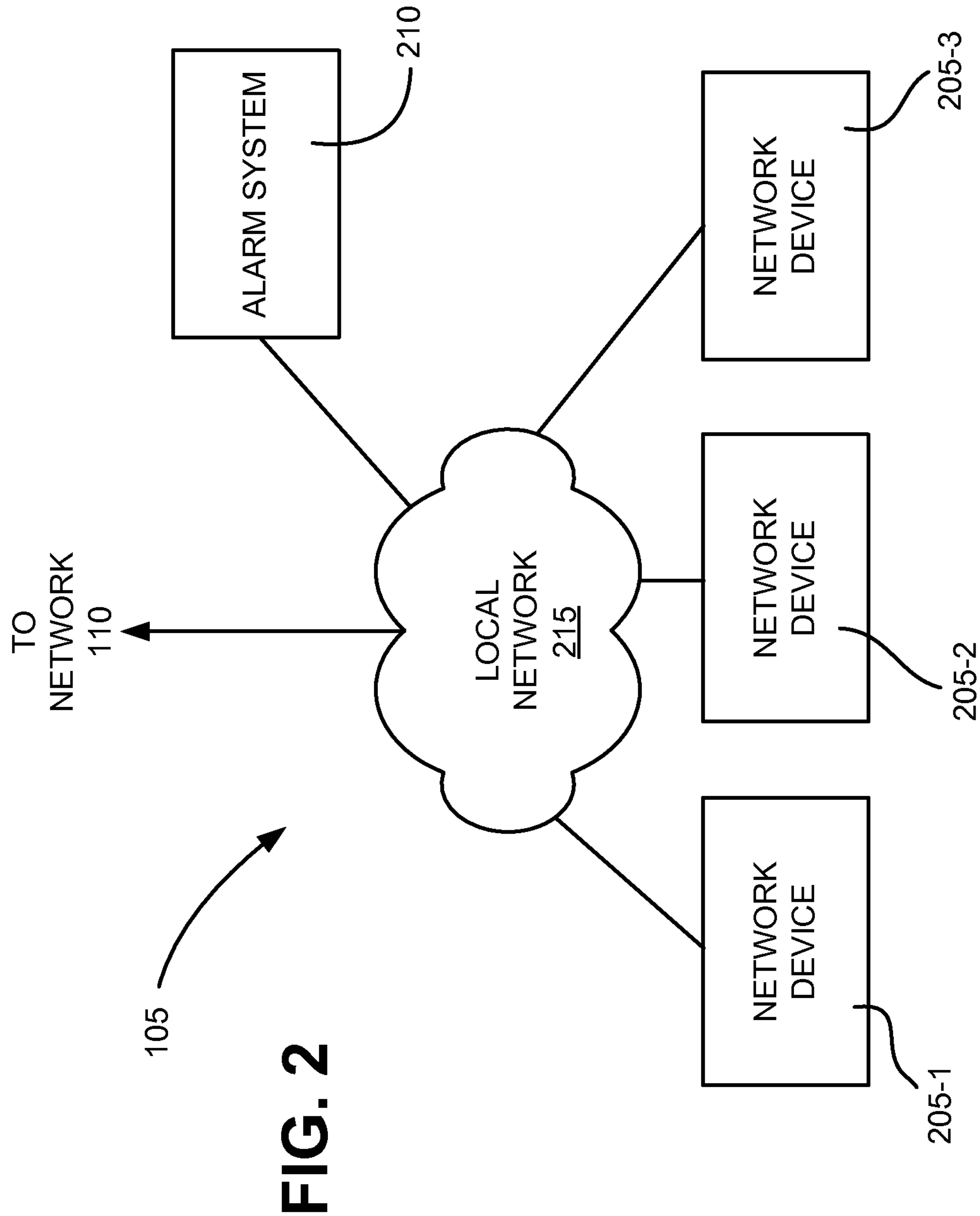
FIG. 2 illustrates a block diagram of an exemplary monitored premise of FIG. 1.

FIG. 2 is a block diagram of an exemplary monitored premise 105 according to embodiments described herein. As shown, monitored premise 105 may include network devices 205-1 to 205-3 (collectively referred to as "network devices 205" and individually referred to as "network device 205"), alarm system 210 connected via a local network 215.

Consistent with embodiments described herein, network devices 205 may include any device that is connected to network 215. For example, suitable network devices 205 may include networking or information technology (IT) related devices, such as workstations, servers, routers, mainframes, etc. Network devices 205 may include any devices for which access or data security is a consideration, such as devices that maintain confidential or important (e.g., valuable) information.

Figure 3:
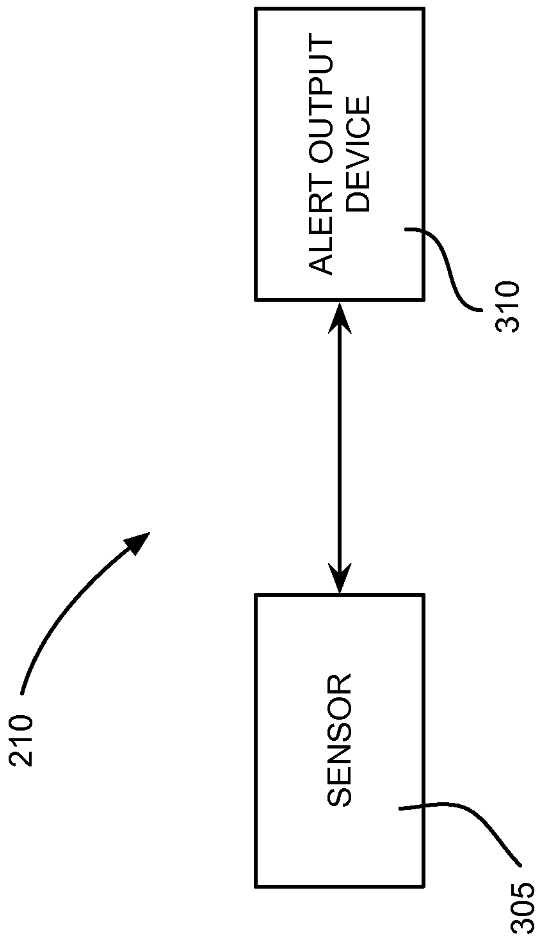
FIG. 3 illustrates a block diagram of an exemplary alarm system of FIG. 2.

Alarm system 210 may include one or more systems for providing protective monitoring of monitored premise 105. Exemplary alarm systems 210 may include fire alarm systems, smoke detectors, burglar/access alarm systems, carbon monoxide detectors, etc. FIG. 3 is a block diagram of an exemplary alarm system 210. As shown alarm system 210 may include a sensor 305 and an alert output device 310. Sensors may include ambient conditions sensors, such as smoke detectors, temperature detectors, glass break or perimeter breach monitors, etc. Alert output device 310 may include an audible or visible alert device, such as a speaker/horn, a light (or lights), etc. In other implementations, alert output device may include a communication device for outputting one or more alert notifications to other devices via networks 120/215, such as to notification server 110, or network devices 205. In such implementations, information regarding alarm event conditions may be transmitted directly from alarm system 210 to notification server 110 for eventual dissemination to network devices 205.

In one implementation, one or more of network devices 205 may include sensors for monitoring a physical environment associated at least a region or area of monitored premise 105. For example, network device 205-1 may include a workstation having an audio sensor (e.g., a microphone) or video sensor (e.g., a camera). Information received via the sensors may be used by network devices 205 and/or notification server 110 to determine the occurrence of an emergency or security event. For example, an audible alert from a security or fire alarm system may be received and recognized by network device 205-1. Information relating to the audible alert may be transmitted to notification server 110 for use in determining whether an emergency event has occurred. In other embodiments, a camera associated with network device 205-1 may monitor for event conditions, such as by recognizing flashing light patterns associated with emergency strobe lights, recognizing smoky conditions, etc.

In one embodiment, network devices 205 may include a security layer (also referred to as a "shim" application) for identifying and/or executing security policies and/or monitoring ambient conditions associated with network devices 205. In some embodiments, the security layer may exchange information with notification server 110 to assist in identifying and responding to alarm event conditions.

In some implementations, the event handling rules may be application or resource-based. In such instances, depending on the event handling rule or policy applied, certain resources (e.g., applications, network connections, web sites, services, etc.) may be disabled or blocked, while other resources may remain available. In some implementations, one or more of network devices 205 may be shut down or otherwise deactivated in response to the received event handling rule information. In still other implementations, data or other information on network device 205 may be automatically moved or copied to another device (e.g., a remote backup device) in the event of an alarm condition.

The environment described in FIGS. 1-3 is simplified for the purposes of brevity and may include any number of monitored premises 105, network devices 205, networks 120/215, alarm systems 210, or notification servers 110. In addition, environment 100 may include other devices not depicted in FIG. 1. Implementations may further include one or more notification servers 110 residing in a single network or domain, or spread across multiple networks and/or domains. The functionality of notification server 110 may be implemented in other devices, such as a particular network device 205 (e.g., a desktop computer, laptop, or network device, such as a router, gateway or switch). Additional details regarding the operation of notification server 110 and network devices 205 are set forth below.

Figure 4:
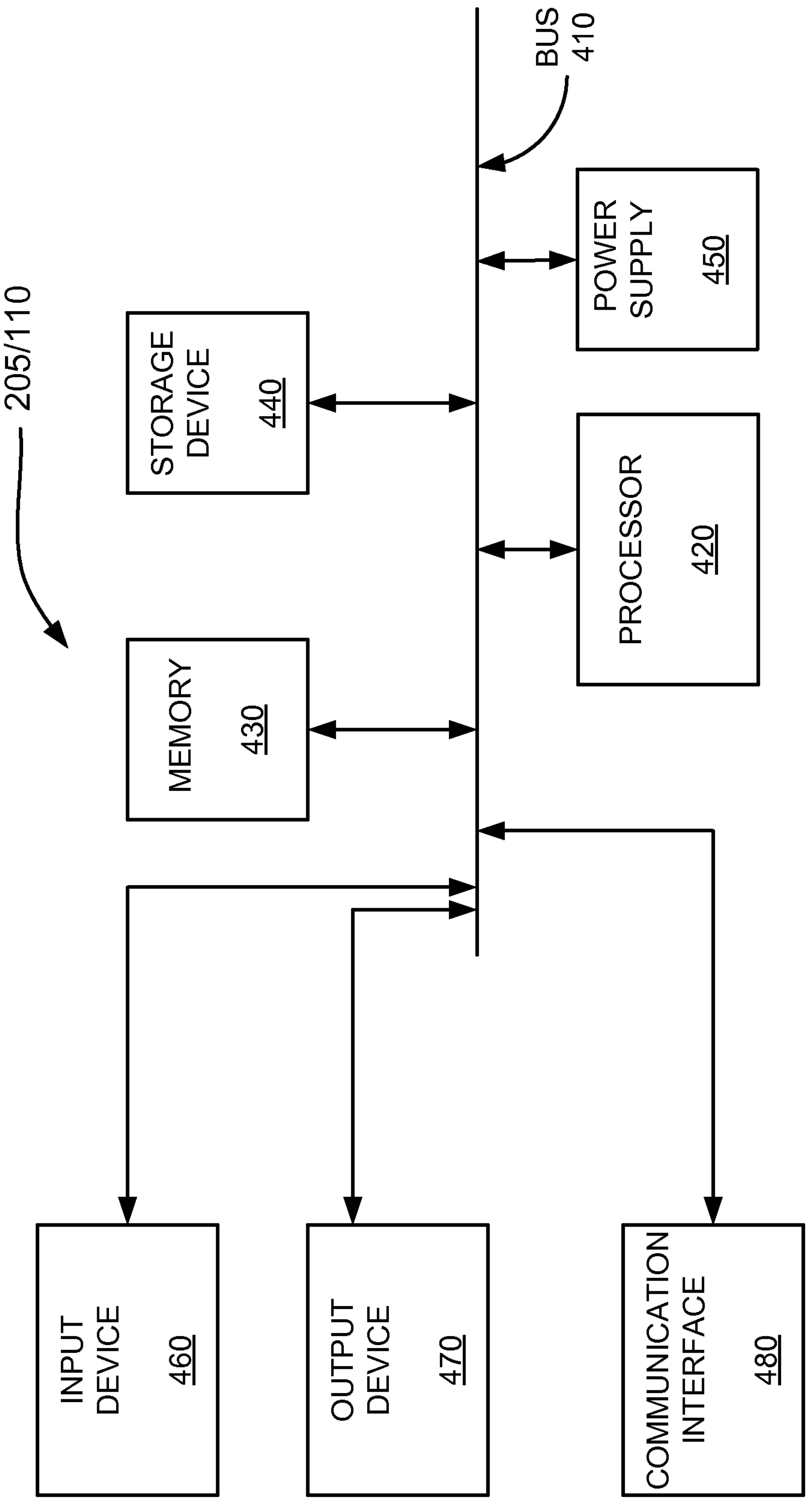
FIG. 4 is a diagram illustrating exemplary components of a device of FIGS. 1 and 2.

FIG. 4 is a diagram illustrating components of exemplary network device 205. In some implementations, network devices 205 and notification server 110 may include similar components. Referring to FIG. 4, network device 205 (e.g., a workstation, monitoring device, etc.) may include bus 410, processor 420, memory 430, storage device 440, power supply 450, input device 460, output device 470, and communication interface 480. Network device 205 may be configured in a number of additional ways and may include other or different components. For example, network device 105 may include additional components, such as one or more modulators, demodulators, encoders, decoders, etc., for processing data.

Bus 410 may include a path that permits communication among the elements of network device 205. Processor 420 may include one or more processors, microprocessors, application specific integrated circuits (ASICs), field programmable gate arrays (FPGAs), or other processing logic that may interpret and execute instructions. Memory 430 may include a random access memory (RAM) or another type of dynamic or static (e.g., read only memory (ROM)) storage device that may store information and instructions for execution by processor 420. Storage device 440 may include a magnetic and/or optical recording medium. Power supply 450 may include a battery or other source for powering network device 205.

Input device 460 may permit a user to input information to network device 205, such as a camera, a sensor (e.g., a motion detector), microphone, a keypad, a keyboard, a touch screen, a mouse, a pen, etc. Other exemplary input devices or sensors are described above. Output device 470 may output information to the user, such as a display, a printer, one or more speakers, etc.

Communication interface 480 may include a transceiver that enables network device 205 to communicate with other devices and/or systems, such as other network devices 205 and/or notification server 110. For example, communication interface 480 may include interfaces, such as a modem or Ethernet interface, for communicating via a network, such as networks 120 and 215.

In implementations consistent with embodiments described herein, notification server 110 and/or network devices 205 may perform processing associated with ascertaining and enforcing device or premises security rules in the event of an identified alarm event condition. Network devices 205 and/or notification server 110 may perform these operations in response to processor 420 executing sequences of instructions contained in a computer-readable medium, such as memory 430. A computer-readable medium may include a physical or logical memory device. The software instructions may be read into memory 430 from another computer-readable medium, such as data storage device 440, or from another device via communication interface 480. The software instructions contained in memory 430 may cause processor 420 to perform processes that are described below. Alternatively, hard-wired circuitry may be used in place of or in combination with software instructions to implement processes consistent with the embodiments described herein. Thus, implementations described herein are not limited to any specific combination of hardware circuitry and software. For the purposes of this application, a "computer" may be defined as a device, or combination of devices, that performs mathematical or logical operations, or that assembles, stores, correlates, or otherwise processes information.

Figure 5:
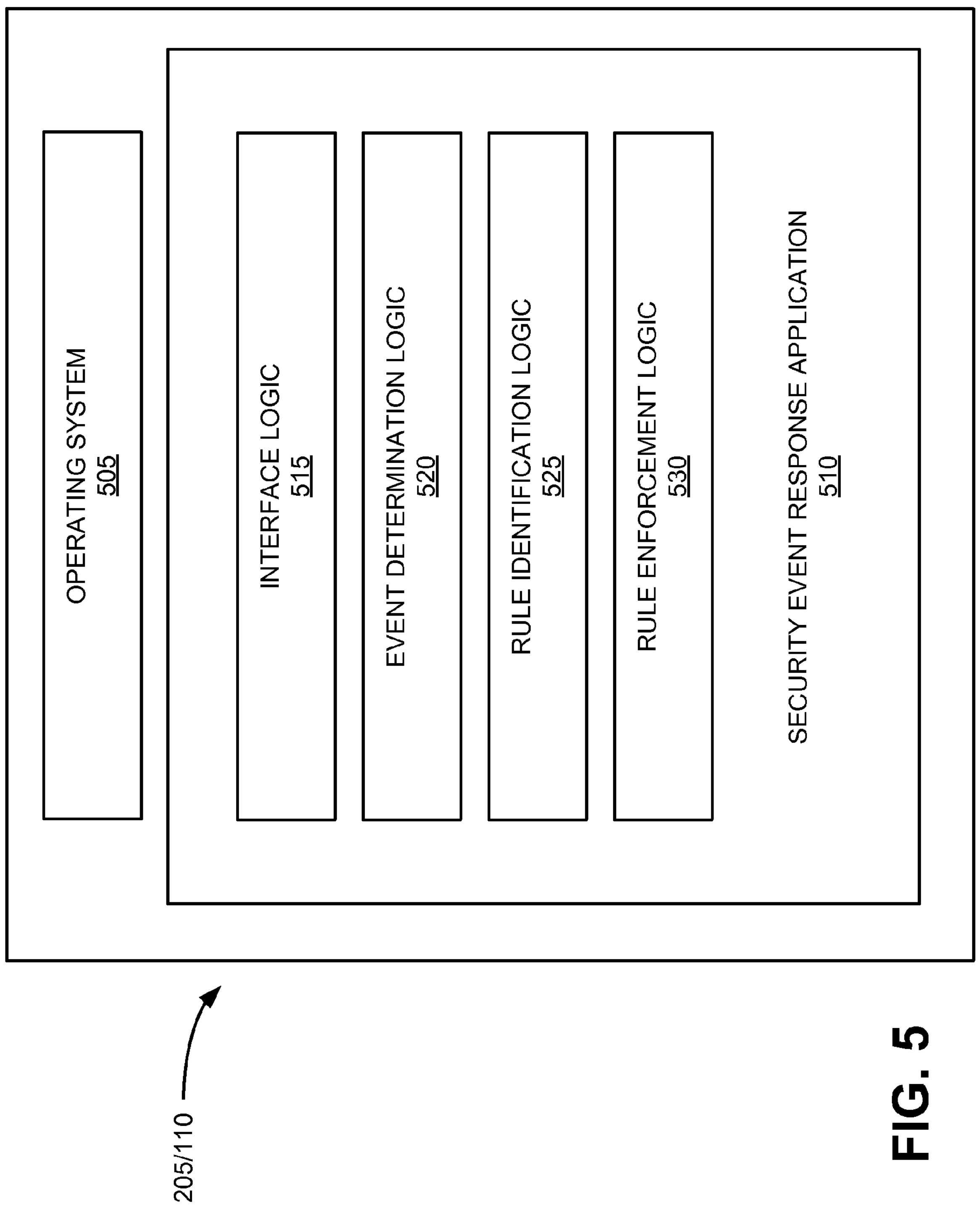
FIG. 5 is a functional block diagram of exemplary components implemented in the network device or notification server of FIGS. 1 and 2.

FIG. 5 is a functional block diagram of exemplary components implemented in network device 205 and/or notification server 110 of FIG. 1. The logical blocks illustrated in FIG. 5 may be implemented in software, hardware, a combination of hardware and software. In alternative implementations, some or all of the components illustrated in FIG. 5 may be implemented in other devices or combinations of devices, such as network device 205, notification server 110, and/or other devices (e.g., firewalls, access points, routers, etc.). Referring to FIG. 5, network device 205 and/or notification server 110 may include operating system 505, and a security event response application 510 that may include, interface logic 515, event determination logic 520, rule identification logic 525, and rule enforcement logic 530. Various logic components illustrated in FIG. 5 may be implemented by processor 420 executing one or more programs stored in memory 430. In some implementations, one or more components of FIG. 5 may be implemented in other devices associated with network device 205 and/or notification server 110. In addition, security event response application 510 may include a single or more than one executable application.

Operating system 505 may include software instructions for managing hardware and software resources of network device 205. Operating system 505 may manage, for example, its file system, device drivers, communication resources (e.g., radio receiver(s), transmission control protocol (TCP)/IP stack), event notifications, etc. Operating system 505 may include Microsoft Windows, Apple® OS X, a variant of Linux or Unix (e.g., Ubuntu, Red Hat, etc.), an embedded operating system, a mobile operating system (e.g., iOS, Android, etc.), etc.

Security event response application 510 may be configured to receive alarm or emergency event status information from one or more network devices 205 (e.g., from applications or services executing on network device 205), alarm system 215, or notification server 110 (e.g., for remotely triggered events). In response to the received information, security event response application 510 may identify security policy rules based on the received information, and provide instructions or commands to the applications or services based on the applied rules. In other implementations, security event response application 510 may be configured to identify security actions for application based on other techniques, such as if-then processing, etc. In some implementations, security event response application 510 may be included within a particular network device 205, such as a user workstation. In other implementations, all or some of security event response application 510 may be part of notification server 110 connected, as depicted in FIG. 1, to network devices 205 via network 120.

Interface logic 515 may include logic configured to receive information, e.g., from a network device 205, an application or service executing on network device 205, such as an audio or visual capture application or service, or from a remote device, such as notification server 110 via networks 120/215.

More specifically, interface logic 515 may facilitate reception of event triggering information (e.g., alarm identification information), alarm notifications, and/or event handling rules from, for example, notification server 110. The received information may enable security event response application 510 to identify and apply/execute event handling policies or rules associated with an identified alarm event condition.

In addition to alarm event condition information, interface logic 515 may also facilitate exchange of registration information with notification server 110. For example, upon boot up or initial negotiation with network resources (e.g., Internet protocol (IP) address configuration, etc.), network device 205 may register with notification server 110. Registration with notification server 110 may ensure that network device 205 receives subsequent event handling instructions from notification server 110 in the event of an alarm event condition. In addition, registration of network device 205 with notification server 110 may enable notification server 110 to collect and store information about network device 250 for comparison during rule identification. Exemplary information includes geographic location information, proximity location information (e.g., relative to other devices in premise 105), device type information, etc.

As described herein, security event response application 510 may operate in both a stand-alone mode and a network mode. In the stand-alone mode, security or alarm event conditions are determined, for example, via monitoring or periodic polling of sensors or other input devices on network device 205. For example, audio information received via a microphone associated with network device 205 may be periodically compared to reference audio signal information corresponding to one or more event conditions, such as a fire alarm, a security alarm, police sirens, etc. In the event of a local alarm event condition, security event response application 510 may be configured to transmit a notification of the event to notification server 110 and also identify and execute security rules associated with the identified event condition. Operating in stand-alone mode protects network device 205 from either unauthorized device access or data loss in the event of a condition that causes a loss in network connectivity to notification server 110.

In the network mode, security event response application 510 may be configured to receive (via interface logic 515) event notification messages or commands from notification server 110. The received notification messages may indicate a type of event and may include commands or instructions for event handling by security event response application 510.

In exemplary implementations (e.g., in stand alone mode), event determination logic 520 may be configured to receive ambient conditions information from sensors or other input devices 460 associated with network device 205. For example, as described above, event determination logic 520 may receive audio information from a microphone associated with network device 205. In other implementations, one or more temperature sensors associated with network device 205 may be monitored and compared to a threshold temperature. Temperatures above a predetermined threshold may trigger a fire event determination.

In other implementations (e.g., in network mode), event determination logic 520 may receive alarm event notifications from notification server 110. In such implementations, the alarm event notifications may include identification of an event type and, optionally, instructions or commands for execution by rule enforcement logic 530. That is, in some implementations, security rules may be stored and maintained on network device 205 for identification and execution by security event response application 510. However, in other implementations, the security rules may be stored on notification server 110 and transmitted to network devices 205 in advance of, or contemporaneously with alarm event notifications. In a hybrid implementation, default rules may be maintained by network devices 205 and exception rules may be transmitted to network device 205 by notification server 110 in the event of a change to default event handling rules.

Event determination logic 520, based on the received information or notifications, may be configured to generate event information that includes a premises identification (for specific alarm conditions) or geographic area information (for weather related or non-premises specific event conditions), and an event type identifier associated with the identified event. Exemplary event type identifiers may include: fire, lockdown, breach, terror, tornado, hurricane, etc. In some implementations, the event information may include specific information relating to the event as received from the notification source. For example, a received tornado watch notification may include hours demarking a duration of the watch. In some implementations, event identification may include a priority identification associated with the event to allow ranking of rules for application by network devices 205.

Rule identification logic 525 may be configured to identify one or more security rules to apply or execute based on the event identified (or received) by event determination logic 520. Different security rules may be configured or established for different types of alarm event conditions. For example, a fire alarm event may be associated with a security rule to instruct network device 205 to display evacuation information and shut down network device within a predetermined period of time. The rule may further indicate that an animate countdown time is to be displayed. In other implementations, the rule may instruct security event response application 510 to perform a data backup to a remote server.

Granularity may be implemented with respect to applied security rules. The security rules may be based on particular users, user accounts, network device identifications, resource types, time of day, day of week, premise type, alarm event type, alarm location, etc. In other implementations, broad security rules may be applied for an entire organization or premise type.

In one implementation, established security rules may be stored or otherwise maintained in storage 430, such as a lookup table, database, or other data structure. As described briefly above, in different implementations, security rules may be stored locally to network device 205 or may be stored and associated with notification server 110. In some implementations, security rules may be stored in both locations, to protect against network connectivity losses in the event of an event condition.

Identification of one or more security rules by rule identification logic 525 may be performed in response to event determination logic 520 identifying an event condition. Rule identification logic 525 may be configured to compare event information from event determination logic 520 to a number of stored conditions and to identify one or more associated security rules. For example, event determination logic 520 may determine that a tornado alert has been issued for a particular geographic area. Rule identification logic 525 may initially compare the alert information against geographic locations of premises associated with security event response application 510. Rule identification logic 525 may then compare the event information against a number of security rules associated with identified premises (if any). If a security rules matching the premises and event type is identified, rule identification logic 525 may forward any commands or instructions associated with the rule (or rules) to rule enforcement logic 530. In some implementations, rule identification logic 525 may be located on notification server 110 and rule enforcement logic 530 may be located on network devices 205.

Figure 6:
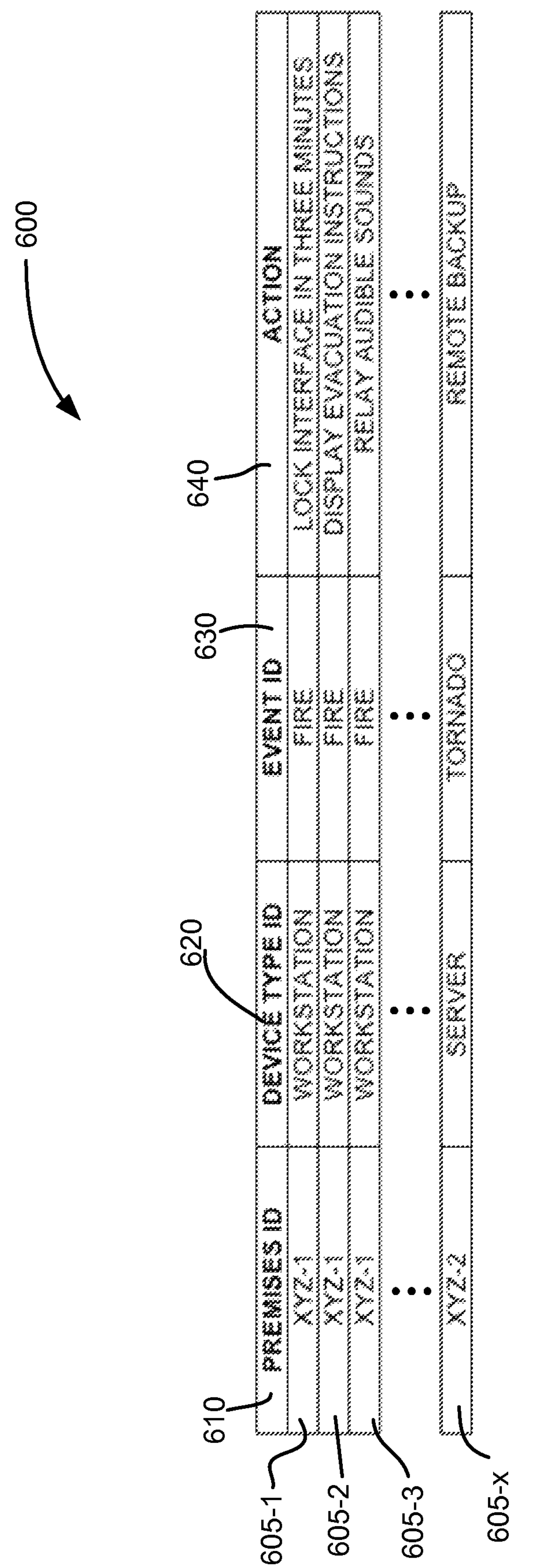
FIG. 6 is a block diagram illustrating an exemplary security rule table.

FIG. 6 is a table 600 of exemplary security rules for a number of particular monitored premise 105, a number of network device types, and a number of event types. For example, as shown, security rules table 600 may include a number of entries 605-1 to 605-*x* (collectively referred to as "entries 605" and individually as "entry 605"). Each entry 605 in security rules table 600 may correspond to a particular event and action pair. As shown, it is possible for a single event type to include a number of different security rules for a single network device or device type. Upon receipt of event identification information (e.g., from event determining logic 520), rule identification logic 525 may identify one or more matching entries 605. An entry 605 may include a premises identifier field 610, a device type field 620, an event identifier field 630, and an action field 640. Security rules table 600 may include more, fewer, or different fields than those shown in FIG. 6.

Premises identifier field 610 may include a value representing a particular premise 105. In some implementations, the premise identifier value may include a number or sequence of alphanumeric characters that uniquely identify a particular premise associated with security event response application 510. For example, rule entry 605-1 indicates a premises identifier of "XYZ-1," indicating facility 1 of XYZ company. In other implementations, unique number sequences may be used to identify premises 105 in rules table 600.

Device type field 620 may include a value representing the type or types of devices associated with the particular entry 605 in rules table 600. For example, rule entry 605-1 indicates a device type value of "workstation," indicating that entry 605 applies to workstations in the premises. Other exemplary device type values include server, kiosk, ATM (automated teller machine), annunciator, etc.

Event identifier field 630 may include a value representing the event associated with the particular entry 605. As described above, exemplary event identifiers may include "fire," "breach," "robbery," "terror," "tornado," "hurricane," etc. In some implementations, event identifier values may include codes corresponding to a number of possible alarm event conditions.

Action field 640 may include a value representing an action or actions to be executed by network devices 205 associated with the rule (e.g., identified by the premise identifier and the device type identifier). Although depicted in FIG. 6 in long hand form for ease of understanding, in other implementations, action field values may include codes or other alphanumeric sequences associated with an action or set of actions. For example, a common action may be assigned to a number of different event types.

As shown in entry 605-1, an exemplary action field value may include "lock interface in three minutes." This value may indicate that the user interface associated with the network devices 205 identified by premise and device type fields 610 and 620 are to be locked-out in three minutes upon identification of the event type indicated in event identifier field 630. Other exemplary action field values may include "display message 'Evacuate Immediately!'," "lock cash drawers," "relay audible sounds," etc.

Returning to FIG. 5, upon identification of an event, e.g., from event determining logic 520, rule identification logic 525 may look up any applicable security rules in table 600. In some implementations, multiple tables may be used. For example, a first table may provide a correlation between an identified event and a particular premise 105 associated with the event. In this implementation, a second table may specify the security rules for execution. In other implementations, entries in table 600 may be provided on per user and/or per resource level granularity.

In any case, identified security rules may be forwarded to rule enforcement logic 530 for execution. As described above, in some implementations this may include transmitting the identified rules (or actions associated with identified rules) to rule enforcement logic 530 via networks 120 or 215. In such implementations, security event response application 510 may cause rule identification logic 525 to transmit the identified rule information to network devices 205 identified in the rule (e.g., associated with the identified premises). For example, as described above, network devices 205 may register with notification server 110 and may therefore become associated with a particular premise 105 as particular device types. This registration allows rule identification logic 525 to transmit rule information to appropriate network devices 205.

Rule enforcement logic 530 may be configured to execute the actions identified by rule identification logic 525. For example, upon identification of an applicable security rule, e.g., by rule identification logic 525, rule enforcement logic 530 may cause respective network devices 205 to execute the actions specified in the rule. For example, rule entries 605-1 to 605-3 specify respective actions of "lock interface in three minutes," "display alert message "Fire in Building! Evacuate immediately," and "display alert message "System Locked in [countdown timer: 3 mins]." In this example, rule enforcement logic 530 for identified types of network devices 205 may cause the network devices 205 to 1) display an alert indicating that a fire has been reported in the building, 2) display an alert indicating that the system will be locked and a countdown timer set to three minutes, and 3) lock the system at the expiration of the timer.

In some implementations, actions taken by rule enforcement logic 530 may be overridden or delayed by a local user.

For example, a user may delay the shutdown or locking out of a network device 205 for a predetermined period of time (e.g., 30 seconds, 1 minute, etc.), to give the user time to save work, for example. The criteria for allowing such overrides may be included in the applied rule and may expire after a period of time. For example, a user may delay shutdown of a network device if the user makes a request within 60 seconds of the initial alert message (to avoid unauthorized access after an authorized user has evacuated) and for no longer than 5 minutes. Upon receipt of a local override, rule enforcement logic 530 may attempt action execution periodically until a threshold number of attempts (e.g., 5 attempts) has been made, following which actions are executed regardless of user interaction.

In an exemplary embodiment, rule enforcement logic 530 may enable network devices 205 to be used as remote monitoring devices for use with notification server 110. For example, upon event identification and forwarding of notifications or actions to network devices 205, rule enforcement logic 530 may activate one or more sensors associated with network devices 205 to determine whether individuals are trapped or remain on premises 105. For example, a microphone associated with a network device 205 may be monitored to determine the continued presence of individuals in the proximity of network device 205. In some embodiments, captured audio information from network device 205 may be transmitted or otherwise forwarded to notification server 110 (or other device remote from network device 205, such as emergency services personnel). The captured audio information may be used to determine whether evacuation has successfully removed all individuals from premises 105.

Figure 7:
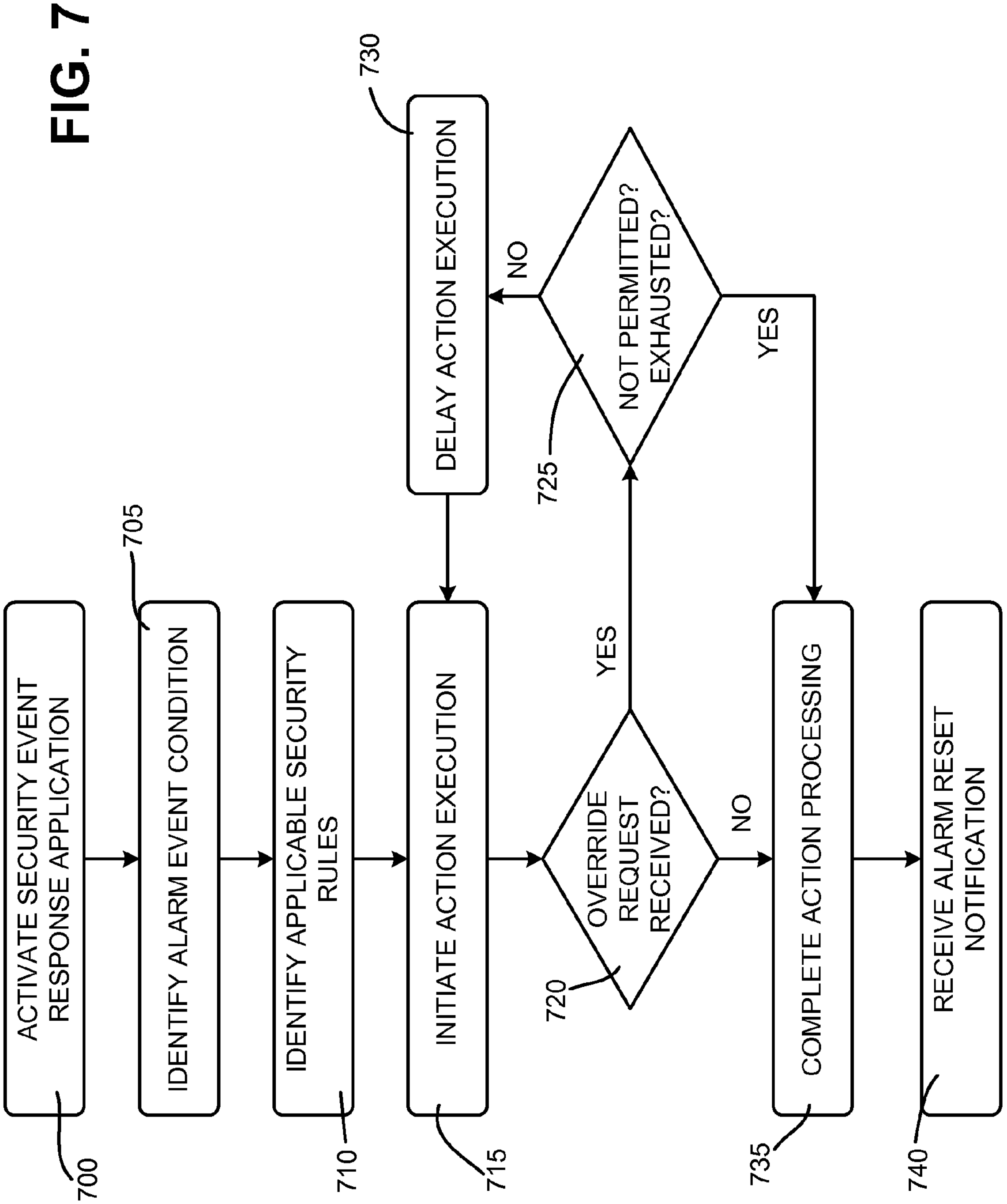
FIG. 7 is a flow diagram illustrating exemplary processing associated with providing an alarm or emergency event security system in the embodiments described herein.

FIG. 7 is a flow diagram illustrating exemplary processing associated with providing an alarm or emergency event security system in an embodiment described herein. Processing may begin with network device 205 (e.g., network device 205-1) activating or otherwise executing security event response application 510 (block 700). For example, in one embodiment security event response application 510 may be included as a startup or login item on network device 205. As described above, security event response application 510 may be implemented as a shim or system service configured to operate on top of other applications or processes.

Network device 205 may identify an alarm event condition (block 705). For example, event determination logic 520 may identify an event condition, such as by "hearing" or sampling an audible alarm signal via a microphone or other sensor. Event determination logic 520 may compare the received sensor or notification information to sensor signatures associated with one or more alarm event conditions. In other implementations, event determination logic 520 may receive an event alert or notification from, e.g., notification server 110 that identifies a particular alarm event condition.

Network device 205 may identify one or more security rules associated with the identified alarm event condition (block 710). For example, rule identification logic 525 may compare information associated with the alarm event condition to a number of security rules to determine whether any rules should be applied. As described above, a number of security rules may be stored or maintained in a security rules table (e.g., table 600). Information regarding an identified event or regarding network device 205 may be used to look up applicable rules in the table.

Network device 205 may initiate execution of actions associated with identified security rules (block 715). For example, rule enforcement logic 530 may be configured to cause network device 205 to execute operations set forth in applicable security rules (as identified by rule identification logic 525). Exemplary rule enforcement actions include device lockdown, device shut down, remote data backup, output of emergency instructions directions.

As described above, in some embodiments, rule enforcement logic 530 may cause network devices 205 to act as remote sensors for notification server 110. In this implementation, microphones or other sensors associated with network devices 205 may be activated to listen for predetermined sounds, such as sounds associated with peoples' presence, such as sounds above a predetermined volume level, sounds having particular vocal characteristics (e.g., sound signatures), etc. In other implementations, other types of sensors may be used to monitor ambient conditions, such as a heartbeat detection sensor Network device 205 may determine whether a local user override attempt has been received (block 720). In some circumstances, a user of a network device 205 may wish to delay the actions being executed by rule enforcement logic 530, such as when they wish to save data, send an email, shut down manually, etc.

If an override request is not received (block 720—NO), processing continues to block 735 where action processing is completed. However, if an override request is received (block 720—YES) (e.g., via a user interface associated with security event response application 510), rule enforcement logic 530 may determine 1) whether overrides are not permitted in accordance with the enforced rule and 2) whether a predetermined number of override requests has already been received (block 725).

For example, assume that a fire alarm rule allows users to locally override the execution of rule actions one time for a total of 3 minutes. In this case, when a user attempts to override the actions a second time, security event response application 510 may prevent the override and may continue the execution of the rule actions.

If it is determined that either rule overrides are not permitted or have been exhausted, (block 725—YES), processing continues to block 735. However, if it is determined that either rule overrides are permitted or have not been exhausted, (block 725—NO), network device 205 may delay execution of the rule actions for a predetermined period of time (e.g., 60 seconds) (block 730). Processing may then return to block 715 after expiration of the time period.

Network devices 205 may receive an alarm reset notification (block 740). For example, security event response application 510 may receive a reset message (e.g., an alarm flag reset message) from notification server 110. The alarm reset message may cause security event response application 510 on network devices 205 to cease any actions still in progress and allow resumption of user activities. In most circumstances, an alarm reset message will not unlock network devices 205 without user login or input of access credentials. In other implementations, a manual reset of security event response application 510 may be performed by restarting or otherwise informing security event response application 510 that the alarm event condition has been cleared.

Figure 8:
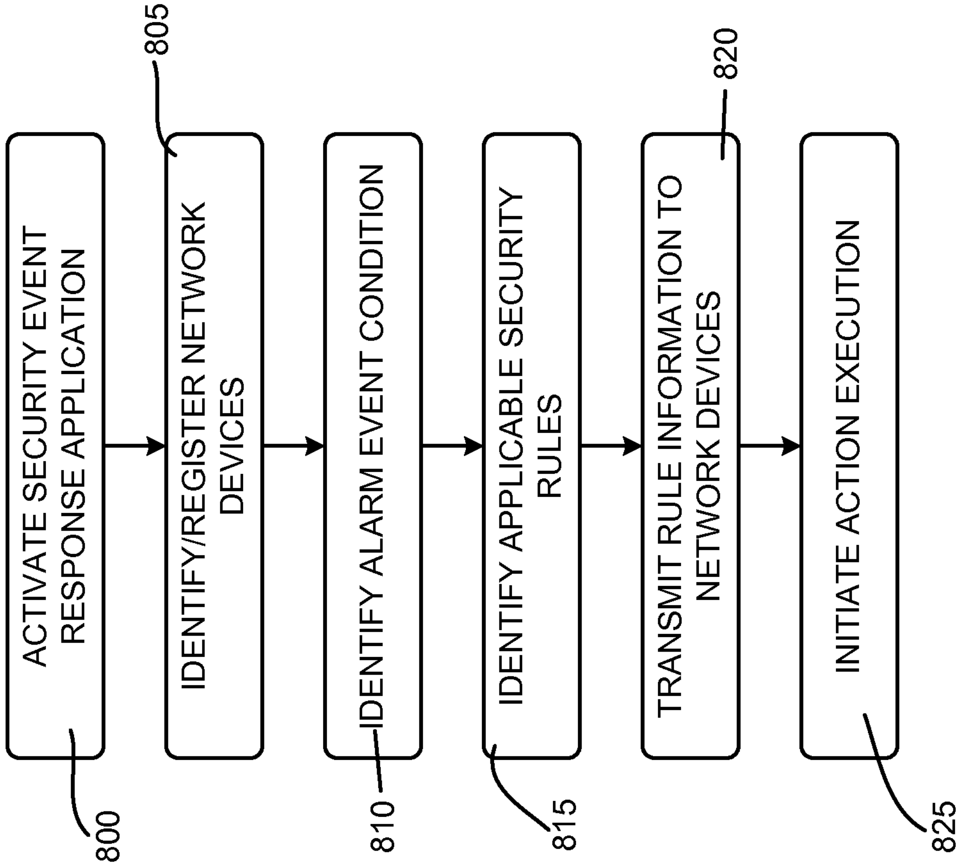
FIG. 8 is a flow diagram illustrating exemplary processing associated with providing a stand-alone alarm or emergency event security system in the embodiments described herein.

FIG. 8 is a flow diagram illustrating exemplary processing associated with providing a network-based alarm or emergency event security system. Processing may begin with each of network device 205 (e.g., network device 205-1) and notification server 110 activating or otherwise executing respective versions of security event response application 510 (block 800). For example, in one embodiment security event response application 510 may be included as a startup or login item on network device 205 and notification server 110.

As generally described above, in some implementations notification server 110 may execute the event identification and rule identification portions of security event response application 510 and network device 205 may execute the rule enforcement portion of security event response application 510 (e.g., as a client device to notification server 110). In this manner, event identification and rule maintenance for a number of network devices 205 and premises 105 may be performed by a common server or set of servers (e.g., notification server 110). As described above, portions of security event response application 510 (e.g., rule enforcement logic 530) may be implemented as a shim or system service configured to operate on top of other applications or processes in network device 205.

Notification server 110 may identify network devices 205 associated with security event response application 510 (block 805). For example, network devices 205 associated with a particular premise 105 may be identified based on Internet protocol (IP) addresses (or ranges of IP addresses) associated with premise 105. In other implementations, information regarding a lightweight directory access protocol (LDAP) directory can be provided to notification server 110 to provide information relating to network devices 205 associated with premise 105 and the locations of such devices.

In other implementations, network devices 205 may affirmatively register with notification server 110. For example, security event response application 510 executing on network devices 205 may be configured to transmit identification and location (e.g., IP address, physical address, etc.) information to notification server 110 at startup or at periodic intervals.

Notification server 110 may identify an alarm event condition (block 810). For example, as described above, event determination logic 520 may identify an event condition, such as by receiving an alarm notification from an alarm system (e.g., alarm system 210). In other implementations, notification server 110 may receive alarm event notifications from other entities, such as emergency services entities, governmental entities, weather forecasting entities, etc.

Notification server 110 may identify one or more security rules associated with the identified alarm event condition (block 815). For example, rule identification logic 525 in notification server 110 may compare information associated with the alarm event condition, such as event location information, time information, descriptive information (e.g., number of alarms for a proximate fire alarm event, etc.) to a number of security rules to determine whether any rules should be applied and to what premises 105/network devices 205 the rules should be applied.

For example, notification server 110 may maintain security rules for a number of premises 105 and network devices 205 in one or more security rules tables 600. Information regarding an identified event or regarding network device 205 may be used to look up applicable rules in the table. For example, event information may indicate a fire alarm on the $3^{rd}$ floor of building A associated with XYZ company. Rule identification logic 525 may identify security rules that apply to network devices associated with XYZ company. One particular security rule may be configured to apply when a fire alarm event is identified in an adjacent building, whereas a second security rule may be configured to apply when the fire alarm even is identified in the same building. In this manner, locations of particular network devices may form a basis for security rules. By comparing alarm event notification information to the available security rules, rule identification logic 525 may determine the network devices to which rules are applicable.

Notification server 110 may transmit rule information to network devices 205 identified by rule identification logic 525 (block 820). For example, rule identification logic 525 in notification server 110 may be configured to transmit information regarding identified security rules to associated network devices 205 via networks 120/215. As described above, in some implementations, notification server 110 may transmit security rule information to network devices 205 that are registered with notification server 110. In other implementations, notification server 110 may transmit the security rule information to all devices in a range of IP addresses associated with the monitored premise 105 related to the alarm event condition.

Network device 205 may initiate execution of actions associated with the received security rules (block 825). For example, rule enforcement logic 530 may be configured to cause network device 205 to execute operations set forth in applicable security rules (as identified by rule identification logic 525). Exemplary rule enforcement actions include device lockdown, device shut down, remote data backup, output of emergency instructions, etc. Several exemplary use cases consistent with implementations described herein are provided below for illustrative purposes.

Exemplary actions may include, for network devices 205 at a business premise 105, in response to a fire alarm event condition: locking out network devices 205; displaying evacuation instructions; perform a data backup to a remote server; and capturing audio from a microphone to determine trapped people.

For network devices 205 associated with a bank premises 105, in response to a silent alarm event condition, actions may include: locking out network devices 205, disallowing user override, requiring alarm condition reset to allow login, and capturing audio from a microphone to assist law enforcement.

For network devices 205 associated with an airport premises 105, in response to a terror alert event condition, actions may include: display of public instructions on terminal screens and lockout of agent terminals.

For network devices 205 associated with a stadium premises 105, in response to a emergency event condition, actions may include: display of public instructions on terminal screens, lockout of point of sale terminals to prevent sales, and lockout of cash drawers.

For network devices 205 associated with a school premises 105, in response to a fire alarm event condition, actions may include: lockout of network devices 205, display of evacuation route information and capturing audio from a microphone to determine non-evacuated individuals.

Implementations described herein relate to devices, methods, and systems for providing device security in the event of alarm event conditions that may otherwise undermine security. In one implementation, alarm event notifications are provided to a notification server. The notification server identifies security rules for enforcement by identified network devices and transmits the rules (or instructions relating to the rules) to the network devices. The network devices, upon receipt of the rules or instructions, execute actions to secure the devices. Actions may include shutdown of the device, lockdown of the device, or remote backup of data associated with the device.

In some exemplary implementations, network devices may operate in a stand-alone manner to identify the alarm event conditions by monitoring ambient conditions, such as audio signatures. The network devices may compare the ambient conditions to conditions associated with alarm event conditions and may initiate security rule actions when alarm event conditions are identified.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of blocks have been described with respect to FIGS. 7 and 8, the order of the blocks may be varied in other implementations. Moreover, non-dependent blocks may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:

identifying a security event condition associated with a computer device, wherein identifying the security event condition comprises at least one of:

receiving a notification of the security event condition from a notification server via a network, or capturing audio or video information associated with the computer device and identifying the security event condition based on a pattern identified in the captured audio or video information;

identifying one or more security rules for execution based on the computer device and the identified security event condition, wherein the one or more security rules define security related actions to be performed upon occurrence of the security event condition;

initiating the security related actions by at least one processor on the computer device to secure the computer device from unauthorized use;

receiving a local override request subsequent to the initiating the security related actions; and delaying execution of the security related actions.

2. The method of claim 1, wherein the security related actions comprise at least one of: locking out of the computer device; performing a data backup; displaying emergency instructions; or initiating capturing of ambient conditions information associated with the computer device and transmitting the ambient conditions information to a remote device via a network.

3. The method of claim 2, wherein performing the data backup comprises transmitting data stored on the computer device to another device remote from the computer device.

4. The method of claim 2, wherein initiating capturing of ambient conditions information associated with the computer device comprises initiating audio capture via a microphone associated with the computer device.

5. The method of claim 2, wherein transmitting the ambient conditions information to a remote device via a network comprises transmitting the ambient conditions information to emergency services personnel via the network.

6. The method of claim 1, wherein the notification server is configured to receive alarm or alert information relating to a location of the computer device.

7. The method of claim 1, wherein identifying the security event condition based on the pattern identified in the captured audio or video information comprises identifying an audio fire alarm pattern present in the captured audio information that corresponds to the security event condition.

8. The method of claim 1, wherein capturing audio or video information comprises capturing ambient audio information associated with the computer device, the method further comprising:

comparing the captured ambient audio information to reference audio information associated with the security event condition; and identifying the security event condition when the captured ambient audio information matches the reference audio information associated with the security event condition.

9. The method of claim 1, wherein the one or more security rules are identified from a number of security rules defining security related actions for a number of network devices and a number of security event conditions; and wherein identifying one or more security rules comprises matching the computer device and the identified security event condition to the number of security rules.

10. The method of claim 1, further comprising:

registering the computer device by the notification server;

identifying the security event and identifying the one or more security rules by the notification server; and transmitting information relating to the security related actions to the computer device via a network based on the registering.

11. The method of claim 1, further comprising:

determining whether the local override is permitted for the identified security event condition; and continuing execution of the security related actions when a local override is not permitted.

12. A system for providing device security, comprising:

a network device in a monitored premise, wherein the network device includes a first processor;

a notification server coupled to the network device via a computer network, wherein the notification server includes a second processor;

wherein the second processor is configured to:

store a number of security rules associated with the network device and a number of security event conditions, wherein the number of security rules define security related actions to be performed upon occurrence of the security event conditions;

identify a particular security event condition associated with the network device;

identify one or more security rules for execution based on the network device and the identified security event condition;

transmit information relating to the security related actions associated with the identified one or more security rules to the network device;

receive a local override request subsequent to the initiating the security related actions; and transmit information relating to the local override request to the network device;

wherein the first processor is configured to:

initiate the security related actions to secure the network device, and delay execution of the security related actions based on the received local override request.

13. The system of claim 12, wherein the security related actions comprise at least one of: locking out of the network device; performing a data backup; displaying emergency instructions; or initiating capturing of ambient conditions information associated with the network device and transmitting the ambient conditions information to a remote device via a network.

14. The system of claim 12, wherein the second processor is further configured to:

identify the network device based on an Internet protocol (IP) address associated with the network device or registration information received from the network device.

15. The system of claim 12, wherein the second processor configured to identify the particular security event condition is further configured to receive an event notification from an alarm system associated with the monitored premise, wherein the alarm system is different than the network device.

16. The system of claim 12, wherein the second processor configured to identify one or more security rules for execution is further configured to match the network device and the identified security event condition to the number of security rules.

17. A non-transitory computer-readable memory device having stored thereon sequences of instructions which, when executed by at least one processor, cause the at least one processor to:

identify a security event condition associated with a device, wherein the instructions to identify the security event condition further comprise one or more instructions that cause the at least one processor to:

receive a notification of the security event condition from a notification server via a network, or capture audio or video information associated with the device and identifying the security event condition based on a pattern identified in the captured audio or video information;

identify one or more security rules for execution based on the device and the identified security event condition, wherein the one or more security rules define security related actions to be performed upon occurrence of the security event condition;

initiate the security related actions by at least one processor on the device;

receive a local override request subsequent to the initiating the security related actions; and delay execution of the security related actions.

18. The non-transitory computer-readable memory device of claim 17, wherein the security related actions comprise at least one of: locking out of the device; performing a data backup; displaying emergency instructions; or initiating capturing of ambient conditions information associated with the device and transmitting the ambient conditions information to a remote device via a network.

19. The non-transitory computer-readable memory device of claim 17, wherein the instructions to identify a security event condition associated with a device further comprise one or more instructions for causing the at least one processor to receive an event notification from a notification server via a network.

* * * * *